United States Patent [19]

Blanding

[11] 4,015,293
[45] Mar. 29, 1977

[54] CUTAWAY TAPE GUIDE FOR SELECTIVELY COOPERATING WITH A CAPSTAN AND GUIDING A TAPE

[75] Inventor: Douglass L. Blanding, Leroy, N.Y.

[73] Assignee: Eastman Kodak Company, Rochester, N.Y.

[22] Filed: Aug. 22, 1975

[21] Appl. No.: 607,001

[52] U.S. Cl. ............................. 360/130; 226/174; 242/194; 360/85; 360/95

[51] Int. Cl.² ................. G11B 23/04; G11B 15/66; G11B 5/52

[58] Field of Search .............. 360/85, 95, 132, 130; 242/193–194, 197–200; 226/76, 191, 192, 189, 174

[56] References Cited

UNITED STATES PATENTS

| | | | |
|---|---|---|---|
| 2,590,665 | 3/1952 | Williams | 360/90 |
| 3,665,120 | 5/1972 | Larkin | 360/85 |
| 3,673,348 | 6/1972 | Larkin | 360/85 |
| 3,674,942 | 7/1972 | Sugaya | 360/95 |
| 3,678,213 | 7/1972 | Sato | 360/95 |
| 3,764,757 | 10/1973 | Inaga | 360/85 |
| 3,790,055 | 2/1974 | Sims, Jr. | 226/174 |

Primary Examiner—Alfred H. Eddleman
Attorney, Agent, or Firm—R. Cody

[57] ABSTRACT

A rotatable guide post having a conical guiding surface and a hollowed-out interior cavity is provided within a coaxial-reel cassette for cooperating with a capstan and for directing a magnetic tape along two different tape paths depending on whether the tape is wound within the cassette between the coaxial reels or is withdrawn from the cassette and wrapped around a helical recording drum. By adapting the post to freely receive a capstan into the cavity and by additionally cutting away a sidewall of the post to reveal the cavity, the capstan may be selectively exposed to the tape, and as such performs the dual function of a drive and cylindrical guide. The post, with appropriate selective orientation, translates the tape directly between the reels by means of the conical surface, or guidedly directs the tape to and from the recording drum, about which it helically wraps, by means of the cylindrical surface of the capstan.

11 Claims, 7 Drawing Figures

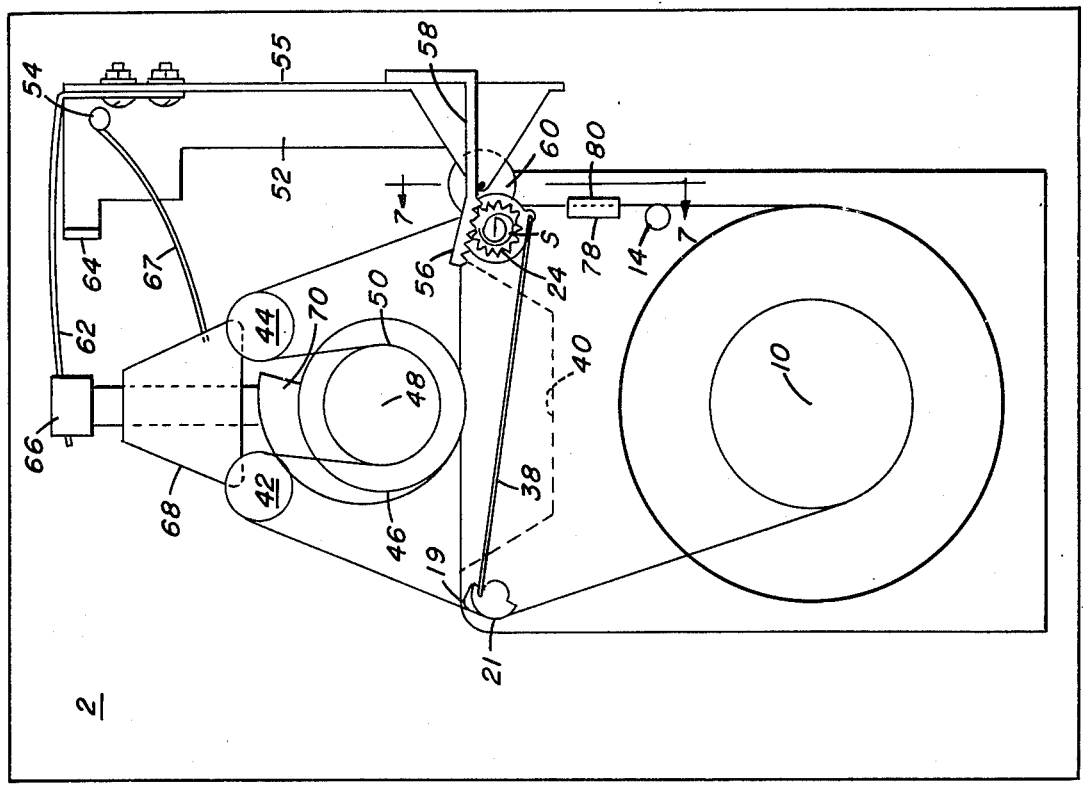
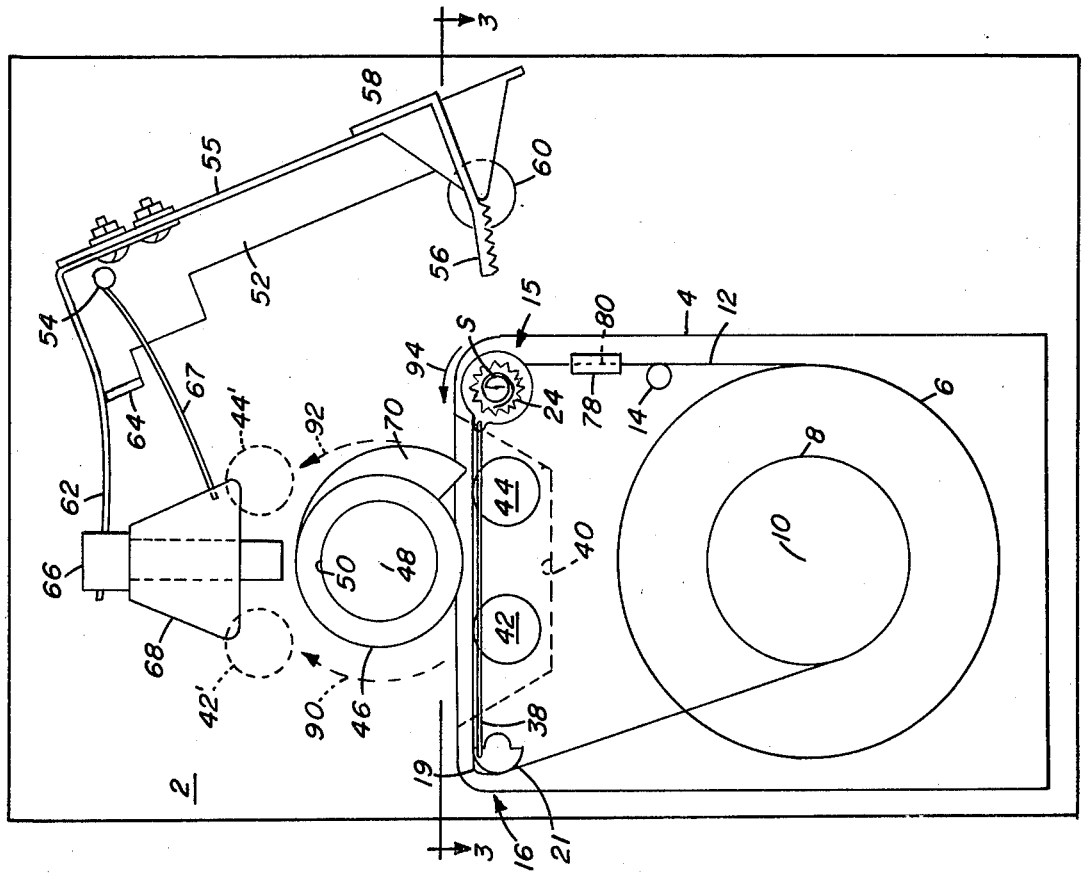

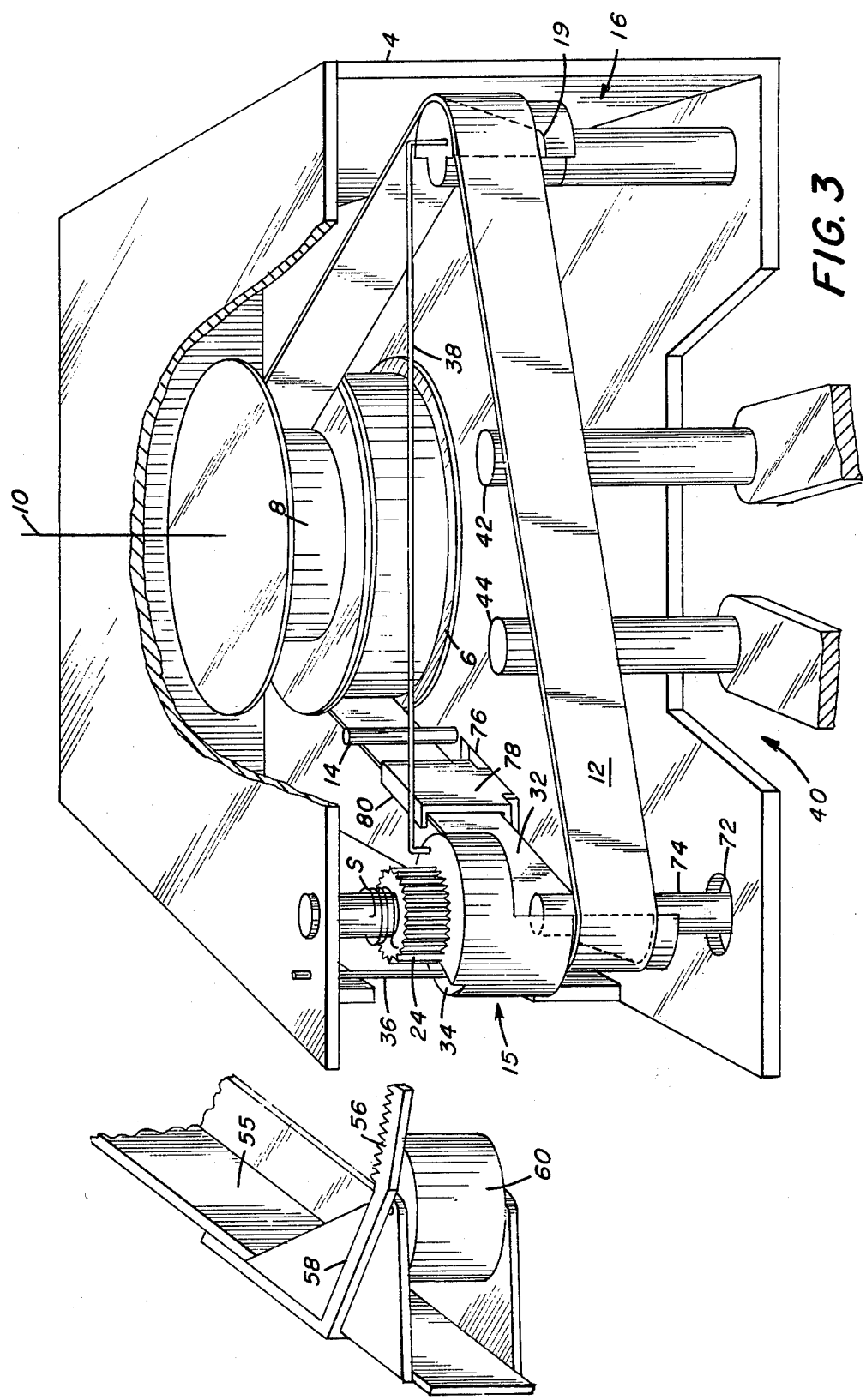

CUTAWAY TAPE GUIDE FOR SELECTIVELY COOPERATING WITH A CAPSTAN AND GUIDING A TAPE

CROSS-REFERENCE TO RELATED APPLICATIONS

The following applications are related to each other: U.S. patent application Ser. No. 607,002, filed Aug. 22, 1975, entitled "Multioriented Composite-Surface Tape Guide for Use in a Cassette," by Douglass L. Blanding; U.S. patent application Ser. No. 606,994, filed Aug. 22, 1975, entitled "Yieldable, Coaxially-Driven Tape Wrapping Guides for Use in a Helical Tape Recorder," by Douglass L. Blanding; U.S. patent application Ser. No. 606,995, filed Aug. 22, 1975, entitled "Rotatable Multifaceted Tape Guide for Use in a Cassette," by Thomas G. Kirn.

BACKGROUND OF THE INVENTION

1. Field of the Invention

This invention relates in general to apparatus for guiding a tape through one, or another, tape path in a tape recorder; more particularly, the invention is concerned with guides mounted in a coaxial-reel tape cassette, for guiding magnetic tape selectively through different tape paths, including one path which is so disposed in the tape recorder that a television signal train may be helically recorded on the tape. (As used herein, the term "recorder" shall be taken to mean apparatus which either plays back or records a video signal.)

2. Description Relative to the Prior Art

While not so restricted, the invention acquires a special significance when it is used to guide magnetic tape contained in a coaxial-reel cassette toward and away from a helical recording drum in a video tape recorder. Coaxial-reel cassettes are particularly well adapted for use with video recorders, which generally tend to be bulky, since cassette takeup and supply reels are rotated on the same axis. As is usual, coaxial-reel cassettes will have a pair of inclined or tapered guide posts which are so oriented as to take up the change in the tape level between the reels when the tape, fully contained in the cassette, passes directly from one reel to the other.

For helical recording, the tape is initially pulled from the cassette and wrapped around the recording drum at a helix angle. In addition, the helical recording format requires precise positioning of the span of tape which passes around the drum; positioning errors may cause, for example, mistracking during playback. Tracking problems are diminished, however, if the tape follows a precise path into, around, and out of the drum assembly. In one video recorder configuration, the paths into and out of the drum are horizontal and substantially in the same plane as the supply and takeup reels, respectively. The last post before the tape touches the drum and the first post after the tape leaves the drum are designed to change the tape's horizontal level a few degrees so as to dispose the tape properly to form a helix around the drum.

These factors suggest the use of the coaxial-reel cassette with the helical drum assembly; however, this combination is hampered significantly because the tape presented to the helical drum is last touched within the cassette by the inclined or tapered guide posts. What this means is that the last guide surfaces within the cassette will tend to force the tape into an inclined path which is not suitable for presentment to the drum assembly and its associated guides. On the other hand, the tape still needs to be positively guided to the vicinity of the drum at the correct height for proper helical scanning. In an attempt to meet this problem, copending U.S. patent application Ser. No. 606,995, in the name of Thomas G. Kirn, filed concurrently with and assigned to the same assignee as the present application, provides a rotatable guide, for use within a coaxial-reel cassette, having right circular conical and cylindrical surfaces on opposite sides thereof. By providing such a guide, with appropriate selective orientation, a tape may be translated directly between the reels by means of the conical surface, or guidedly directed to and from a recording drum, about which it helically wraps, by means of the cylindrical surface. Although the cylindrical surface will suitably direct the tape to the drum assembly, the upright conical surface still contributes undesirable stress differentials and distorts the tape as it passes thereabout from one coaxial level to the other.

Further refining this approach, copending U.S. patent application Ser. No. 607,002, in the name of Douglass L. Blanding, filed concurrently with and assigned to the same assignee as the present application, provides a guide for use within a coaxial-reel cassette, having composite conical and cylindrical surfaces. By obliquely orienting the conical surface with respect to the cylindrical surface, their composite juncture presents a smooth, continuous guiding surface. Such a guide translates the tape free of distortion directly between the reels by means of the cylindrical and conical surfaces together, or guidedly directs the tape to or from the recording drum, about which it helically wraps, by means of the cylindrical surface alone. When the latter path is so directed to the drum that the tape cannot clear the conical surface, the post is rotated sufficiently to provide such clearance.

Apart from the selective use of two contiguous guiding surfaces mounted within a cassette, it is known to selectively substitute a guide post mounted on the recorder for a post located in the cassette so as to achieve selective guiding through two tape paths, e.g., U.S. Pat. No. 3,678,213. In such a substitution, a spring-biased post, located in a coaxial-reel cassette, is forced out of the tape path by a fixed post on the recorder deck when the cassette is emplaced on the recorder; therefore, two different guide posts are provided for two different paths. However, high speed winding with the tape contained in the cassette is hindered by the presence of the incorrect guide surface. Belgian Patent No. 534,063 illustrates another form of substitution, although not adapted to a cassette, in which a capstan protrudes through an angular slot in a rotatable plate mounted on a recorder. A pressure roller and a guide roll are so mounted on the plate relative to the slot that the plate may be rotated between two tape-encountering positions. In the first position, the tape is pressed against the capstan by the pressure roller to drive the tape. In the second position, with the plate rotated sufficiently that the pressure roller releases the tape from the capstan, the guide roll holds the tape away from the capstan to enable the rewinding of the tape.

Turning now to another course of development in the prior art, U.S. Pat. No. 3,790,055 (to Sims) discloses the cooperation of a capstan with a post in a cassette for quickly stopping the motion of a magnetic tape. The post, which Sims describes as a motion control device, consists of an elongated member having a central cavity within which a freely rotatable capstan fits. The member rotates from a driving position exposing the enclosed capstan to the tape through a cut-away sidewall to a braking position wherein the tape is separated from the capstan and pinched between the sidewall of the member and a resilient pressure member. A similar type of motion control device had previously been proposed in U.S. Pat. No. 2,590,665, although not in conjunction with a tape cassette. For purposes that later will become clearer, the Sims patent is of interest merely because it shows a situation in which a capstan may cooperate with a rotatable element in a cassette.

SUMMARY OF THE INVENTION

Recognizing the desirability of minimizing the number of tape-contacting surfaces in a recorder and, particularly, of combining the functions of several tape-contacting posts so as to reduce the overall size of the recorder, the invention initially proposes the hollowing out of a composite guide of the type disclosed in the earlier mentioned copending application Ser. No. 607,002, to Blanding. The central cavity thereby formed is so disposed as to receive the shaft of a capstan, protruding from the recorder deck, when the cassette is emplaced on the recorder. In addition, a side of the post, corresponding to the cylindrical surface disclosed by Blanding, is removed so that the capstan is exposed through the resulting cutaway. When the tape is contained within the cassette and passes directly between the levels of the coaxial reels, the conical surface is presented to the tape for accommodating the level change. When the tape is withdrawn from the cassette in conjunction with the rotation of the post, the cutaway side is presented to the tape so that the tape rides up against the capstan disposed therein. Therefore, by means of the hollowed-out post, the capstan may doubly perform, first, as the driving element when a pinch roll forces the tape into driving engagement with the rotating capstan, and, second, as the cylindrical surface disclosed by Blanding for directing the tape toward a helical recording drum.

In another aspect of the invention, by providing a cylindrical surface contiguous to the conical surface, the tape is more carefully directed from the reel to the conical surface when the tape passes directly between the reels. In addition, the cylindrical surface is provided with at least one flange for defining the path of the tape around the surface. When the tape is withdrawn from the cassette, the post is rotated sufficiently such that both surfaces clear the tape. In yet another aspect, by providing an aperture in the bottom of the cassette, a precision edge guide mounted on the recorder may be adapted to enter the cassette through the aperture when the cassette is emplaced on the recorder. The guide is so disposed on the recorder as to contact the tape and precisely define the path of the tape after the post is rotated and the tape has fallen onto the capstan.

BRIEF DESCRIPTION OF THE DRAWINGS

The invention will be described with reference to the figures, wherein:

FIGS. 1 and 2 are top views illustrating two modes of a presently preferred embodiment of the invention;

FIG. 3 is a perspective cross-sectional view taken generally along line 3—3 in FIG. 1;

DESCRIPTION OF THE PREFERRED EMBODIMENTS

Figure 4:
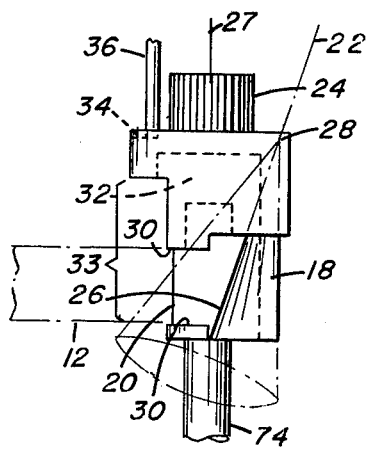
FIGS. 4 and 5 are side and front elevation views of the rotatable guide of the invention as shown in FIG. 1.

Because helical tape recorders are well known, the present description will be directed in particular to elements forming part of, or cooperating more directly with, the present invention. Recorder elements not specifically shown or described may take various forms well known to those skilled in the art.

Referring specifically to FIG. 1, there are shown the parts of a helical video recorder which are sufficient for an understanding of the present invention. A helical tape recorder 2 is provided for use with a coaxial-reel cassette 4. A supply reel 6 is coaxially disposed at a first level in the cassette 4 with respect to a takeup reel 8 at a second level. To facilitate understanding, the reels 6 and 8 are shown with different diameters in FIGS. 1 and 2, although this will ordinarily not be the case. The respective arrangement of the reels is illustrated in FIG. 3. Each reel 6 and 8 is mounted in the cassette 4 for rotation around a common axis 10. A magnetic tape 12 leaves the supply reel 6 and passes around guide posts 14, 15, and 16 during the course of its travel to the takeup reel 8. As better shown in FIGS. 4 and 5, the guide 15 has two tape-contacting guide surfaces formed thereon; a conical surface 18 formed from a section of a frustum of an oblique circular cone and a cylindrical surface 20 formed from a section of a right circular cylinder. The conical surface 18 has an axis 22 obliquely directed both with respect to the axis of the cylindrical surface 20 and the axis 10 of the coaxial reels 6 and 8. The cylindrical surface 20 is disposed on the guide post 15 at the level of the supply reel 6. Furthermore, the tape 12 is introduced to the conical surface 18 such that it is tangent to the conical surface 18 along a line 26. The significance of this orientation is that the plane and direction of travel of the tape 12 is changed as it passes around the conical surface 18 without incurring a distribution of stress differentials on the tape 12. Thus, while the angle of incline of the tape 12 is changed, as is necessary, the tape 12 still enters and exits from the conical surface 18 in a vertical plane. The cone from which conical surface 18 is taken, shown in broken lines, has an apex 28 which points generally toward the level of the takeup reel 8. The cylindrical surface 20 is provided with flanges 30 which are spaced apart a distance equivalent to the width of the tape 12. The flanges 30, though formed on the cylindrical part of the guide 15, prevent lateral wandering of the tape 12 while the tape 12 rides across the conical surface 18.

Figure 5:
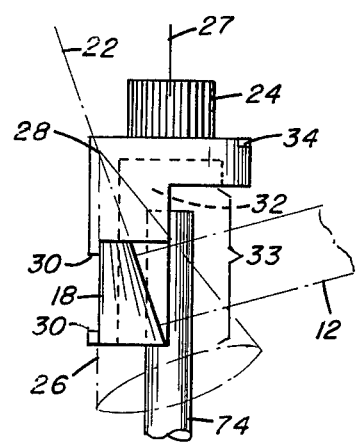
Figure 6:
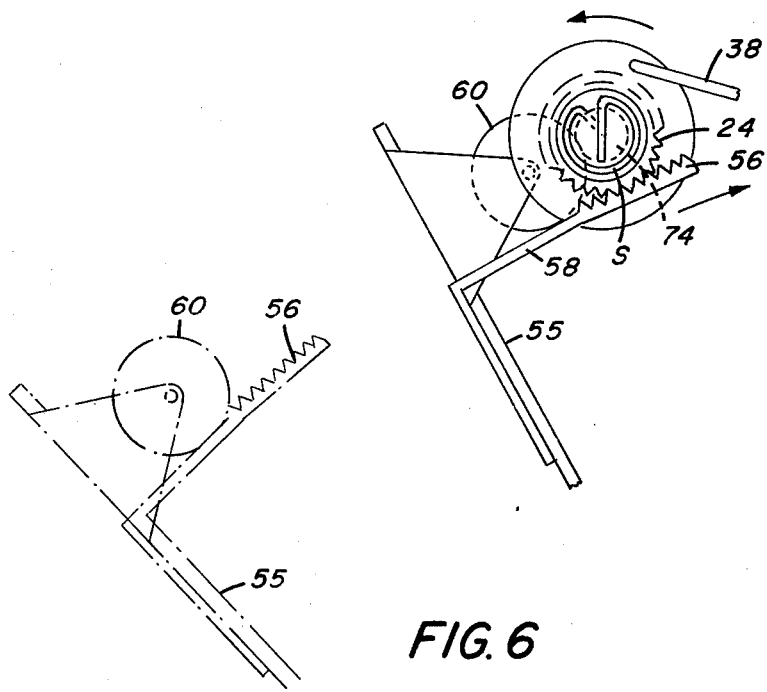
FIG. 6 shows in solid line the relationship of the rack, pinch roll, and rotatable guide as illustrated in FIG. 2 and in dotted line the same relationship as illustrated in FIG. 1.
Figure 7:
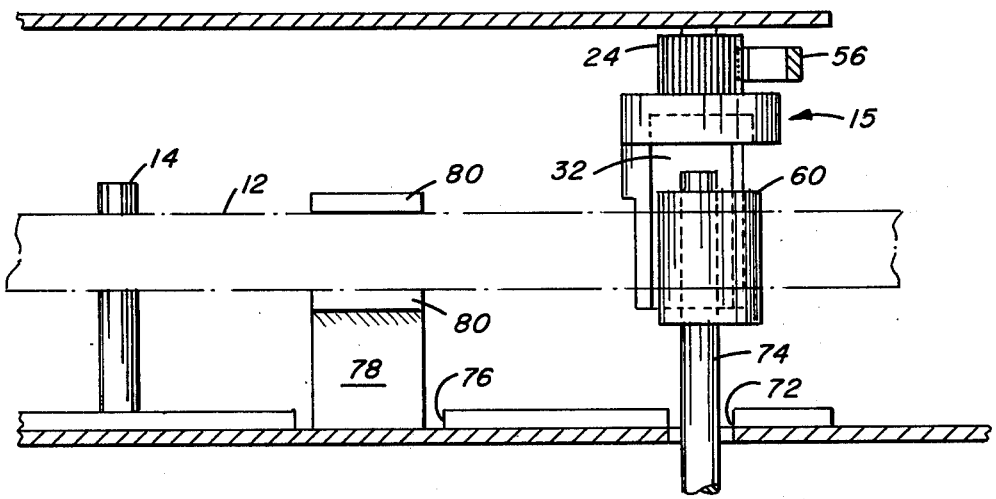
FIG. 7 is a cross-sectional view taken generally along line 7—7 in FIG. 2.

As shown in FIGS. 3 through 5, a pinion 24 is disposed on the post 15 for rotation about an axis 27. An interior portion 32 of the post 15 is hollowed out, as indicated by the dotted lines in FIGS. 4 and 5 and as best seen in FIG. 7. The hollowed-out interior cavity 32 is further exposed by a cut-away side generally depicted as 33. A ledge 34, as best seen in FIG. 3, is cut into the top of the post 15 and provides a channel in which a stop 36 rides. The top surface of the post 15 also receives a linkage 38 which moves in conjunction with the rotation of the post 15. The post 16 is mounted for rotation within the cassette; the other end of the linkage 38 is connected to the top surface of the post 16 for providing such rotation. A spring S, schematically depicted in FIG. 1, rotationally biases the guide post 15 so that it presents the conical surface 18 for cooperation with the tape when the cassette 4 is not within the recorder 2. The post 16 is similarly biased by the spring S by means of the linkage 38, so that it presents the conical surface 19 for cooperation with the tape.

The guide post 16 thus far described is the same as that post disclosed in the above-mentioned copending application Ser. No. 607,002, by Blanding, and reference is made to that application for a more specific description of the structure, function, and operation of the guide post. To reiterate those points sufficient for an understanding of the present invention, the post 16 includes two contiguous surfaces, a conical surface 19 and a cylindrical surface 21. The conical surface 19 is similar to the conical surface 18 on the post 15 except that it defines an apex pointing generally toward the supply reel 6 and is positioned generally at the level of the takeup reel 8.

Referring again to FIG. 1, the cassette 4 has a cut-away front face 40, hereinafter sometimes referred to as a window, which is so designed as to permit the positioning of a pair of tapered threading guides 42 and 44, also referred to as tape wrapping guides, behind the tape 12. The opening 40 is sufficiently extensive to expose the guide 15, for purposes which will be seen hereafter. The threading guides 40 and 42 are mounted on drive gearing, not specifically described but generally designated by gear assembly 46 for rotational movement around an axis 48. A recording drum 50, carrying at least one recording head (not shown), is rotatable about the axis 48. The path of the recording head is slanted with respect to the tape 12 so that helical recording may take place when the tape 12 is wrapped around the drum 50 by the movement of the guides 42 and 44 (to be later described).

A spring-biased lever 52 is provided for movement around a pivot 54 on the recorder 2. The lever 52 has a vertically extending side member 55, better shown in perspective in FIG. 3, which serves to mount a rack 56 by means of a flexible arm 58 and to support a resilient pressure roller 60, sometimes hereinafter referred to as a pinch roller. A leaf spring 62, affixed to the lever 52, is in contact with a plunger 66. The plunger 66 which is free to slide within a block 68 translates to the spring 62 the motion of a cam 70 mounted for rotation on the gear assembly 46. A return spring 67 ensures the return of the plunger 66 to the position illustrated in FIG. 1 when the cam 70 releases the plunger 66 in a manner to be hereafter described.

The cassette 4 is provided with an opening 72, as shown in FIG. 7, for allowing a capstan 74 to pass through. The capstan 74, the opening 72, and the cut-away interior portion 32 of the post 15 are so arranged that the shaft of the capstan 72 is freely received within the cut-away portion 32 when the cassette 4 is emplaced on the recorder 2, as shown variously in FIGS. 3 through 7. The cassette 4 is further provided with another opening 76 for receiving an edge guide 78 mounted on the recorder 2. Flanges 80 are provided on the edge guide 78 for directing the tape from the supply reel 6 to the capstan 74.

FIGS. 1 and 2 illustrate the two modes of operation of the presently preferred embodiment. FIG. 1 shows the apparatus in a position as depicted in perspective by FIG. 3 wherein the tape passes across the guides 15 and 16 from the supply reel 6 to the takeup reel 8. Each guide 15 and 16 presents a conical surface 18 and 19, respectively, to the tape which differ in that their apices are inversely disposed with respect to each other. In addition, the tape 12 is guided onto the conical surface 18 by the cylindrical surface 20. The flanges 30 define the edges of the path of the tape 12 across the cylindrical surface 20 and prevent edgewise wandering of the tape. In accordance with the disclosure in the above-mentioned copending application Ser. No. 607,002 by Blanding, the tape rides around the conical surface 19 on the post 16 and across the cylindrical surface 21 on its way to the takeup reel 8.

To commence the wrapping operation, the tape threading guides 42 and 44 rotate about the axis 48 along the paths 90 and 92, respectively (shown by broken lines in FIG. 1), until they reach the positions 42' and 44' (also shown by broken lines). In this position, further illustrated in FIG. 2, the tape 12 is helically wrapped around the drum 50 so that the recording head travels an oblique path across the tape 12. Another copending application Ser. No. 606,994, also in the name of Douglass L. Blanding and assigned to the same assignee as the present invention, discloses a preferred drive means for rotating the tape threading guides 36 and 38 from the unwrapped position to the wrapped position, and back again; after the wrapping and unwrapping motions are completed, a suitable switch or motor control unit disables the drive means.

The cam 70 rotates concurrently with the movement of the threading guide 44, also in the direction of the arrow 92 (FIG. 1). As the cam 70 proceeds to the position portrayed in FIG. 2, the face of the cam 70 encounters the plunger 66 and cams it through the block 68 against leaf spring 62. The spring 62 forces the lever 52 in a clockwise direction so that the rack 56 enters the open front face 40 of the cassette 4 and engages the pinion 24 on the guide post 15. The subsequent rotation of the guide post 15 in the direction of arrow 94 accomplishes several functions in the cassette 4: the post 15 is so rotated as to clear both the cylindrical surface 20 and the conical surface 18 from contact with the tape 12; simultaneously, the cut-away side 33 is moved adjacent the tape 12, revealing the capstan 74 inside, and the tape 12 falls into contact with the capstan 74. Additionally, as the tape 12 falls onto the capstan 74, it slips sideways a predetermined distance in the cassette 4 so chosen that the tape 12 now rides against the guide 78 and between the flanges 80. The linkage 38 rotates together with the post 15 and forces a similar, but counter, rotation in the post 16 until the cylindrical surface 21 is disposed adjacent the tape 12. Finally, the pinch roller 60, also supported on the lever 52 for movement toward the cassette, resiliently urges the tape 12 into driving engagement with the capstan 74. With all these interrelated movements completed, as shown in FIG. 2, recording may commence. When it is desired to draw the tape 12 back into the cassette 4, all the movements are basically reversed. Of particular mention, when the cam 70 releases the plunger 66, the lever 52 will begin to rotate in response to the torque of the return spring 67 until resuming the position depicted in FIG. 1. The guide posts 15 and 16 are simultaneously counterrotated by the retreating rack 50 and the linkage 38, respectively, until the surfaces 18 and 19 are again presented to the tape 12.

Copending application Ser. Nos. 606,994, and 607,002, both in the name of Douglass L. Blanding and assigned to the same assignee as the present invention, are incorporated herein by reference; reference is made to these applications for a more specific description of the path of the tape 12 across and through the window 40. In particular, it is noted that the plane of the tape 12 toward and away from the guides 15 and 16 is always maintained parallel to the rotation axis 10 of the coaxial reels 6 and 8 whether the tape 12 passes across the window 40 or out of the cassette 4 through the window 40.

The invention has been described in detail with particular reference to preferred embodiments thereof, but it will be understood that variations and modifications can be effected within the spirit and scope of the invention.

What is claimed is:

1. For use in a cassette of the type adapted for cooperation with a helical scan recorder having a rotatable capstan for driving a tape, the cassette having first and second coaxial reels and a window out of which the tape may be withdrawn and helically wrapped around a recording drum, the cassette further having at least one guide post disposed in the path of travel of the tape as it passes from one of the reels to the other, the improvement:
   a. wherein the post comprises a guiding surface provided on said post for guiding the tape between the first and second reels when the tape is not withdrawn out of the cassette window, said post having a cavity therewithin and a cut-away sidewall exposing said cavity,
   whereby the capstan of said recorder may be freely received within said cavity and exposed through said cut-away sidewall; and
   b. wherein said cassette includes means for rotating said guiding surface of said post away from guiding contact with the tape and for presenting said cut-away sidewall to the tape,
   whereby said tape may ride against the capstan disposed within said post cavity.

2. The apparatus as claimed in claim 1 wherein said guiding surface comprises a conical member having an axis obliquely disposed with respect to the axis of the reels.

3. A coaxial-reel cassette for use in a recorder of the type wherein a tape is pulled from the cassette and wrapped around a recording drum by at least one movable tape wrapping guide, the cassette having a window through which the tape is withdrawn by the tape wrapping guide, the cassette also having an opening for permitting a capstan to pass therethrough into the cassette, the cassette further having first and second guide posts mounted therein on opposite sides of the window for guiding the tape either across the window and between the reels or through the window, the improvement:
   a. wherein the posts are adapted for rotation from a first position when the tape is not withdrawn through the window to a second position when the tape is pulled out of the cassette through the window by the tape wrapping guide, each said post having a conical surface so disposed on said post as to guide the tape between the reels when said posts are in said first position;
   b. wherein said first post has a cylindrical surface for guiding the tape when said post is in said second position; and
   c. wherein said second post has a hollowed-out interior and a side thereof cut away so that the capstan may fit therein, said second post being adapted to present said cut-away side to said tape when said second post is in its second position, thereby to permit said tape to contact the cylindrical surface of said capstan.

4. For use with a cassette that cooperates with a helical scan video tape recorder of the type wherein a magnetic tape is helically wrapped around a recording drum by at least one tape wrapping guide and advanced thereafter by a capstan, the cassette being of the type wherein the tape is wound between a first reel and a second reel which rotate around a common axis at a first and second level, respectively, the tape wrapping guide being adapted to withdraw the tape from the cassette through a window therein and wrap the tape around the recording drum, the recorder further having a fixed guide member which guides the tape when it is withdrawn through the window, the cassette having at least one post mounted therein to guide the tape either from one reel to the other reel or through the window, the improvement:
   a. wherein the post comprises first and second parts, said first part having a cylindrical guiding surface for directing the tape away therefrom, said second part having a conical guiding surface for orienting the tape between the first and second levels of the cassette when the tape is not withdrawn through the window, said conical surface being obliquely disposed within the cassette with respect to said cylindrical surface for receiving the tape from said cylindrical surface and for guiding the tape between the first and second levels along an inclined path and in a vertical plane which is parallel to the rotation axis of the reels, means defining a cavity within said post and a cut-away sidewall of said post whereby the capstan fits therein for rotation without contacting said means; and
   b. wherein the cassette further includes means for rotating said post from a first position wherein the tape is not withdrawn through the window to a second position wherein the tape is withdrawn out of the cassette window by the tape wrapping guide, the tape being guided by said first and second parts when said post is in said first position, the tape being disposed over said means defining a cutaway so that it is displaced sideways and contacts the capstan fitted therein when said post is in said second position.

5. The apparatus as claimed in claim 4 wherein said cylindrical guiding surface further comprises at least one flange located along the path of travel of one edge of the tape for preventing lateral movement thereof.

6. The apparatus as claimed in claim 4 wherein the cassette further comprises means defining an opening therein for passing the fixed guide member therethrough when the cassette is placed on the recorder, said means being disposed relative to the path of the tape within the cassette that the fixed guide member contacts the tape when said post is in said second position.

7. Apparatus for guiding a tape within a cassette of the type useful with a helical scan recorder having a rotatable capstan for driving the tape, the cassette having a pair of coaxial reels, the reels having a span of tape extending therebetween, and the cassette further having a window across or through which the tape is adapted to extend or be withdrawn, comprising:

a guide post having a longitudinally extending cavity into which the capstan of the helical scan recorder may be inserted for free rotation therein;

a sidewall of said post defined between said cavity and the post exterior surface being cut away to expose said cavity;

a conical guiding surface on said post for guiding the tape across the window and directly between the coaxial reels; and means for rotatably mounting said post in the cassette with the longitudinal axis of said cavity extending transversely of and to one side of the tape, said post being rotatable between (1) a first position in which said conical surface contacts the tape for guiding it across the window, and (2) a second position in which the exposed portion of said cavity faces the tape so that the capstan which is exposed therein when the cassette is emplaced on the recorder may guide and drive the tape out of the cassette window.

8. In combination with a cassette of the type useful with a helical scan video recorder having a rotatable capstan for driving a tape, the cassette having a pair of coaxial reels, the reels having a span of tape extending therebetween, and the cassette further having a window across or through which the tape is adapted to extend or be withdrawn, the apparatus comprising:

a guide post supported for rotation within the cassette, said post having a cavity for use with the capstan which is freely insertable therein, said post having a surface for guiding the tape across the window, said post further having a sidewall cutaway for exposing said cavity to the tape when the tape is withdrawn through the window;

means for biasing the rotation of said post for cooperation of said guide surface with the tape; and means for rotating, against said bias, said post for cooperation of said cut-away sidewall with the tape, whereby the tape contacts the capstan disposed therein.

9. A cassette for use in a helical scan video tape recorder having a capstan for driving the tape, comprising:

a first reel for providing a length of magnetic tape;

a second reel coaxially mounted with respect to said first reel for taking in said length of magnetic tape;

at least one post mounted in the cassette and over which said length of magnetic tape passes, said post having a cavity therein for freely receiving the capstan and a cut-away portion of the cavity wall for exposing the capstan therethrough, said post further having a guiding surface;

a window in the cassette for withdrawing said tape therethrough; and means for rotating said post for presenting said guiding surface to said tape when said tape is not withdrawn through said window and for presenting said cutaway to said tape when said tape is withdrawn through said window, whereby said tape may contact the capstan disposed therein.

10. A tape cassette for use with a helical scan recorder and/or playback apparatus of the type having a window through which said tape may be withdrawn for cooperation with said recorder, said cassette comprising:

a. first and second rotatable reels mounted for rotation within said cassette, said first reel being a tape supply reel and said second reel being a tape takeup reel;

b. first and second guide posts for guiding said tape between said reels and across said window, at least one of said guide posts being provided with a substantially coaxial cavity and a cut-away side exposing said cavity, said cassette being provided with means defining an opening through which the capstan of said recorder may extend into said guide post cavity, and said post having said cavity being selectively rotatable;

c. means for rotationally biasing said rotatable post to present the non-cut-away part of said rotatable post to said tape; and d. means adapted for cooperation with said recorder for rotating said rotatable post to present the cutaway side thereof to said tape when said tape is withdrawn through said cassette window.

11. The cassette of claim 10 wherein said means defining an opening through which said capstan may extend is adapted to accommodate a precision edge guide formed as part of said recorder.

* * * * *